Dec. 5, 1961  J. HERMSEN ET AL  3,012,147
GEIGER-MULLER COUNTER AND RADIATION MEASURING APPARATUS
Filed Dec. 22, 1958

INVENTORS
JOHANNES HERMSEN
KARS VAN DUUREN

BY
AGENT

3,012,147
GEIGER-MÜLLER COUNTER AND RADIATION MEASURING APPARATUS

Johannes Hermsen and Kars van Duuren, Amsterdam, Netherlands, assignors to North American Philips Company, Inc., New York, N.Y., a corporation of Delaware
Filed Dec. 22, 1958, Ser. No. 781,970
Claims priority, application Netherlands Dec. 31, 1957
12 Claims. (Cl. 250—83.6)

This invention relates to a Geiger-Müller counter and to anti-coincidence apparatus comprising such a counter. In particular, the invention relates to apparatus for the measurement of low level beta activities, e.g. determination of radioactive fall-out, activity of waste products, activity of bone, tracer techniques, etc.

The results of measurements of the radioactivity of sample preparations always include an amount of uncertainty owing to the statistical fluctuations introduced by radioactivity not emanating from the sample to be measured, the so-called background radiation. Accurate measurement of weak activities is possible only if the measurement is prolonged for infinite time, or if the background radiation is reduced below the activity being measured. Background radiation has three main components:

(1) Radiation emanating from the construction materials of the counter itself; this may be reduced by correct choice of the materials and by careful cleaning;

(2) Radiation (mostly gamma) emanating from the surroundings where the measurement is performed; this may be reduced by surrounding the sample and the counter with a lead, iron or mercury shield;

(3) Cosmic radiation; this radiation has such strong penetrating power that any shielding, at least of reasonable size, is insufficient.

The measuring results are, moreover, affected by random discharges which are due to unsatisfactory operation of the counter (these discharges are usually termed "spurious counts").

For exact measurements excluding the effect of cosmic radiation, use has hitherto been made of so-called anti-coincidence arrangements, in which the sample and the sample counter for measuring the activity of the sample are surrounded by a large number of guard counters in a manner such that each cosmic meson firing the sample counter fires also one of the guard counters. By suitable circuitry, it may be ensured that the pulse from the sample counter, due to undesired cosmic radiation, is not counted by the counting apparatus or circuits by the coincident presence of the pulse from the guard counter causing the counter circuits to reject the pulse from the sample counter. With this circuitry, the counting apparatus only counts pulses from the sample counter which are due to radiation emitted by the sample to be measured, since these pulses do not fire any of the guard counters.

Since the cosmic radiation enters the counters mainly in a vertical direction from above, it is necessary to screen the sample counter by guard counters from the top, and since some cosmic radiation may enter from the side, guard counters may also be provided along the sides. At the bottom, guard counters are not required. The assembly of sample counter, sample and guard counters must be surrounded by the lead, iron or mercury shield described above. With this arrangement of top and side guard counters the shield will be very bulky and heavy. In another arrangement, the guard counters may constitute elongated cylinders and be arranged horizontally only above the sample counter (with a vertical arrangement only the number of guard counters required is larger than with a horizontal arrangement since this would require in addition a roof of guard counters, the major part of the cosmic radiation, as stated above, entering from above). However, in order to be reasonably certain that with this horizontal arrangement obliquely incident cosmic radiation will be intercepted by the guard counters, they must have a considerable length; at any rate, their length must materially exceed the length of the sample counter. Therefore owing to this great length of the guard counters, the shield required will also be very voluminous and heavy.

The aforesaid anti-coincidence arrangement has a further disadvantage in that satisfactory operation of all guard counters must be regularly checked. Since sometimes as much as sixteen guard counters may be employed, this requires an enormous amount of time. There is, moreover, the strong possibility that one of the guard counters becomes defective, which becomes extremely difficult to locate because all the guard counters are generally connected in parallel. Thus the servicing problem is quite vexing. There is still a further disadvantage of some arrangements in that the space enclosed by the guard counters has a very irregular shape and is unnecessarily large for the accommodation of the sample counter and the sample, since between the guard counters there are spaces that cannot be utilized for housing the sample or the counter.

The main object of the invention is to provide an improved guard counter and anti-coincidence arrangement in which the difficulties enumerated above are obviated.

The Geiger-Müller guard counter according to the invention has two electrodes of extended surface area which constitute a large part of the walls defining a discharge space filled with an ionizable gas containing at least 0.001% of a halogen quench. The two electrodes comprise a hollow anode, for receiving the sample counter, surrounded by a hollow cathode. Preferably, the anode and cathode electrodes comprise two concentric, hollow, sphere halves each integral with one of two coaxial cylinders. The annular opening between the two cylinders is sealed-off in a gastight manner by means of an insulating member whose surface extends substantially at right angles to the axes of the cylinders.

The single guard counter according to the invention replaces the large number of guard counters required in the known anti-coincidence apparatus. The major part of the space within the hollow inner electrode, which communicates with the open air, is surrounded by the discharge space of this guard counter. The sample counter and the sample to be measured can therefore be suitably arranged within the hollow inner electrode. If the spherical parts are placed on top, the incident, cosmic radiation can not fire the sample counter without having traversed the discharge space of the guard counter according to the invention. Since there is only one discharge space involved, satisfactory operation of the counter can be checked in a simple manner with little loss of time.

Owing to the bell shape of the guard counter according to the invention, also laterally-incident cosmic radiation will be intercepted and counted. Further, the total volume of a guard counter according to the invention is materially smaller than the total volume of the long, horizontally-arranged, guard counters of the known device. Hence, also the volume and the weight of the shield screening out the gamma radiation from the surrounding environment may be much smaller. Moreover, a spherical shape has the smallest volume for the largest surface, an additional reason why the quantity of shielding material, which is preferably also shaped in the form of a sphere matching that of the guard counter, can be minimized. To illustrate this advantage, it is noted that one known device contained a shield whose weight was 2500 kgs.; the same shielding was obtained in the inventive combination, which was smaller than the known device by reason of the small inventive guard counter, with a weight of only 1200 to 1500 kgs. A further advantage of a guard counter according to the invention is that the inner electrode, in which the sample counter and the sample are accommodated, contains substantially no unused space. It should finally be noted that owing to the spherical shape of the electrodes in the preferred arrangement, the field gradient between them is at a minimum, which improves the properties of the counter. The counter is, moreover, sensitive throughout the entire discharge space, i.e. substantially the whole volume of the counter.

The invention will now be described more fully with reference to the accompanying drawing in which.

Figure 1:
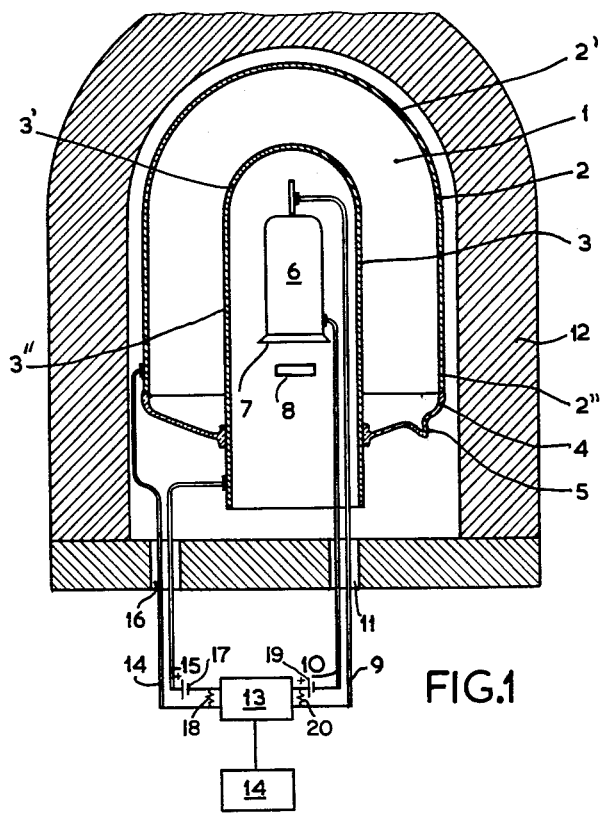
FIG. 1 shows, in cross-section, a counter and apparatus according to the invention.

Referring to FIG. 1 of the drawing, reference numeral 1 designates the discharge space of the guard counter according to the invention, this space being limited on the outer side by the outer electrode 2 of the guard counter and on the inner side by the inner electrode 3. The electrodes 2 and 3 may serve, for example, as cathode and anode, respectively, and be constituted, for example, of chrome-iron. The outer electrode 2 comprises substantially a half spherical portion 2' at the top integral with a cylindrical portion 2'' at the bottom. Similarly, the inner electrode 3 comprises at the top a half spherical portion 3' concentric with the corresponding portion 2' of the outer electrode, and integral therewith a cylindrical portion 3'', open at the bottom, arranged coaxially with the corresponding cylindrical portion 2'' of the outer electrode. The spacing between the inner 3 and outer 2 electrodes is the same in the spherical and cylindrical portions. Reference numeral 4 designates an insulating disc, for example, of glass, which closes off the discharge space 1 in a gastight manner and extends substantially at right angles to the surfaces of the cylindrical portions and also serving to limit the discharge space 1. Reference numeral 5 denotes a sealed exhaust tube, through which the discharge space is filled, for example, with a mixture of a rare gas, for example, argon, and a quantity of a halogen quench, e.g., chlorine. For the low-level beta measuring pparatus, it is preferred to use as the rare gas a neon-argon mixture in the ratio of $1:10^{-3}$ at a pressure of about 200 mm. of mercury, to which is added bromine as the quench at a pressure of 0.05 mm. mercury. Inside the electrode 3, that is the hollow anode, is arranged the sample counter 6, which has, at its bottom end, a mica window 7. For low-level beta counting, an end-window, halogen-quenched, Geiger-Müller counter is preferred. Suitable constructions are well known in the art and are quite conventional. Below the mica window 7 is arranged the sample 8 to be measured, which transmits its radiation through the mica window 7 into the counter 6. The assembly of guard counter, sample counter and sample is closely and completely surrounded by a radiation shield 12, which may consist of the lead, iron or mercury mentioned above, or of combinations thereof. As will be noted, the shield 12 matches the shape of the guard counter (the top of the shield, which is hemispherical and symmetrical with the electrodes 2 and 3, has been cut off in FIG. 1 because of space limitations) so that a minimum of shielding material is required. The counter 6 further has two lead-in conductors which are designated by reference numerals 9 and 10 and are passed through an aperture 11 at the bottom of the shield 12. Also the electrodes 2 and 3 of the guard counter are provided with terminal connections and lead-in conductors 14 and 15, respectively, which also pass through an aperture 16 in the shield 12. Both the sample counter 6 and the guard counter are coupled by way of their lead-in conductors to suitable energizing potential sources 19 and 17 and loads 20 and 18, as is well-known, and to a suitable anti-coincidence circuit 13, which in turn is connected to conventional counting circuits 14.

The operation of the combination just described will be explained in connection with the counting of beta particles from the sample 8 exhibiting weak activity, as this represents the most important application of the combination and the precise situation where a material reduction in the background radiation is essential to enable an accurate measurement to be made.

The beta particles from the sample 8 pass through the window 7 of the sample counter 6 firing it and producing a pulse in the anti-coincidence circuit 13, which is a well-known circuit available from published literature. Beta particles emanating from the sample 8 in the other directions, say, toward the hollow anode 3 of the guard counter, will not be able to fire the guard counter as they are of too low energy to traverse the wall of the electrode 3 and enter the guard counter discharge space 1. Thus only a single pulse from the sample counter will appear in the anti-coincident circuit 13. Under these circumstances, the pulse is passed on to the counting circuit 14 and counted.

When cosmic radiation enters the system from above or from the side, in order to fire the sample counter 6 producing an incorrect pulse, it must first traverse the discharge space 1 of the Geiger-Müller guard counter, causing it to fire. Thus, the output circuits of both the guard counter and the sample counter contain pulses, and the anti-coincidence circuit 13 will reject the pulse from the sample counter under these circumstances. Of course, firing of the guard counter alone will not cause actuation of the counting circuits.

To illustrate the results possible with the inventive device, a description of a specific example is provided. The guard counter electrodes were of chrome-iron with an inside diameter of 32 mm. and an outside diameter of 76 mm. The height from the top of the outer electrode to the bottom of the inner electrode was 81 mm. The fill employed was the neon-argon-bromine fill previously described, and the operating potential was chosen at 800 volts. The discharge characteristic of the guard counter exhibited an excellent plateau with a rise of less than about 2% per 100 volts between voltages of 600 and 1000 volts. An end-window (mica) beta-ray counter was used as the sample counter. With shielding of 20 cm. of iron and 2.5 cm. of mercury, the background counting rate using the anti-coincidence circuitry could be reduced to 0.7–0.9 count per minute, which is amazingly small considering the simplicity of the inventive arrangement. As a matter of fact, it was found that even this small counting rate was probably due to radioactive potassium in the mica window of the sample counter, rather than to cosmic radiation.

Figure 2:
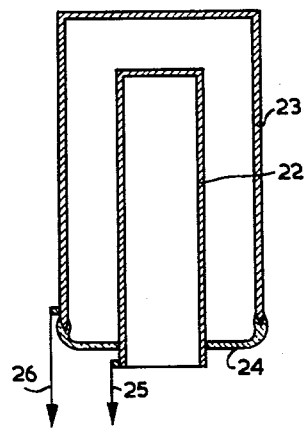
FIG. 2 shows a modification of the counter.

As pointed out earlier, the preferred geometry for the guard counter includes spherical electrodes. This geometry enables the obtention of the smallest-sized counter able to house a conventional beta-ray counter and yet able completely to guard it against cosmic radiation. The smallest guard counter offers the advantage of reducing the size and weight of the required shielding material. Another important advantage is that the electric field throughout the entire discharge spare is substantially uniform and homogeneous, which greatly improves the operating characteristics of such a counter. Other shapes of the guard counter have been found to offer a similar improvement over the known device, though a larger quantity of shielding material was required, so that these other geometries are not as desirable as that illustrated in FIG. 1 of the drawing. For example, satisfactory results have been achieved with the guard counter shape shown in FIG. 2, in which the electrodes 22 and 23 have the shape of coaxial, closed-off cylinders each comprising integral side and top portions spaced about the same distance from each other. Such a geometry, though, requires a much taller guard counter to perform the same guarding function, and the field distribution, especially at the corners is not as satisfactory as that of the FIG. 1 embodiment. In the FIG. 2 embodiment, the electrodes 22 and 23 are of metal, and are thus opaque to low level beta radiation. Their annular space at the bottom is sealed off by substantially transverse insulating means 24, defining a discharge space containing an ionizable fill including a halogen quench. Terminal connections 25 and 26 make electrical connection, respectively, to the inner and outer electrodes.

While we have described our invention in connection with specific embodiments and applications, other modifications thereof will be readily apparent to those skilled in this art without departing from the spirit and scope of the invention as defined in the appended claims.

What is claimed is:

1. A Geiger-Müller guard counter for detecting cosmic radiation comprising a pair of electrodes each comprising integral spherical and cylindrical portions concentric and coaxial with one another, insulating means extending substantially at right angles to the surfaces of the electrodes at portions thereof remote from the spherical portions and closing off the annular space substantially at the ends of the cylindrical portions, the inner cylindrical portion having its end open whereby its interior is accessible to the outside for receiving a radiation detector, said electrodes and insulating means defining a discharge space, an ionizable gas fill containing at least 0.001% of a halogen quench within the discharge space, and means applying potentials to the electrodes at which the counter operates as a Geiger-Müller counter along the plateau region of its discharge characteristic producing pulses in response to cosmic radiation.

2. A guard counter as set forth in claim 1 wherein the main constituent of the gas fill is a rare gas.

3. A guard counter as set forth in claim 2, wherein the gas fill comprises a neon-argon-bromine mixture at a low pressure.

4. A guard counter as set forth in claim 1 wherein the inner electrode constitutes the anode, and the outer electrode constitutes the cathode.

5. Radiation measuring apparatus comprising: a guard counter sensitive to cosmic radiation and the like comprising a first hollow electrode having integral side and top portions, a second hollow electrode surrounding the first electrode and also possessing integral side and top portions spaced about the same distance from the corresponding portions of the first electrode, insulating means extending between the side portions and closing off substantially at the bottom the space between the electrodes, an ionizable gas fill including a halogen quench in the said space, and means for applying potentials to the first and second electrodes at which the guard counter operates as a Geiger-Müller counter along the plateau region of its discharge characteristic and produces electrical pulses in response to cosmic radiation; a sample counter also sensitive to cosmic radiation and the like within the first hollow electrode and also producing electrical pulses in response to cosmic radiation; and anti-coincidence circuitry coupled to both the guard and sample counters to reject pulses of the sample counter when a pulse of the guard counter is simultaneously present.

6. Radiation measuring apparatus comprising: a Geiger-Müller, cosmic ray-responsive guard counter comprising a first hollow electrode having integral cylindrical side and spherical top portions, a second hollow electrode surrounding the first electrode and also possessing integral cylindrical side and spherical top portions spaced about the same distance from the coresponding portions of the first electrode, insulating means extending between the side portions closing off substantially at the bottom the space between the electrodes, an ionizable gas fill including a rare gas and at least 0.001% of a halogen quench in the said space, and means for applying potentials to the first and second electrodes at which the guard counter operates as a Geiger-Müller counter along the plateau region of its discharge characteristic and produces electrical pulses in response to cosmic radiation; a sample Geiger-Müller, cosmic-ray-responsive counter within the first hollow electrode and also producing electrical pulses in response to cosmic radiation; a sample whose activity is to be measured located below the sample counter; radiation shielding having a shape matching that of the guard counter and surrounding the guard counter; and anti-coincidence circuitry coupled to both the guard and sample counters to reject pulses of the sample counter when a pulse of the guard counter is simultaneously present.

7. Low-level beta counting apparatus comprising: a Geiger-Müller, cosmic-ray-responsive guard counter comprising a first hollow electrode having integral side and top portions, a second hollow electrode surrounding the first electrode and also possessing integral side and top portions spaced about the same distance from the corresponding portions of the first electrode, insulating means extending between the side portions and closing off substantially at the bottom the space between the electrodes, an ionizable gas fill including a halogen quench in the said space, and means for applying potentials to the first and second electrodes at which the guard counter operates as a Geiger-Müller counter along the plateau region of its discharge characteristic and produces electrical pulses in response to cosmic radiation; an end window beta-ray-counting and cosmic-ray-responsive, Geiger-Müller sample counter within the first hollow electrode and producing electrical pulses in response to beta and cosmic rays; a beta-ray emitting sample within the first hollow electrode below the sample counter; gamma radiation shielding completely surrounding the guard counter; and anti-coincidence circuitry coupled to both the guard and sample counters to reject pulses of the sample counter when a pulse of the guard counter is simultaneously present.

8. A Geiger-Müller guard counter for detecting cosmic radiation and the like comprising a first open-ended hollow electrode having integral side and top portions, a second hollow electrode surrounding the first hollow electrode and also possessing integral side and top portions spaced about the same distance from the corresponding portions of the first electrode, insulating means extending between the side portions and closing off substantially at the bottom the space between the electrodes, an ionizable gas fill including a halogen quench in the said space, said first hollow electrode being opaque to beta particles and having one end open whereby its interior is accessible to the outside for receiving a radiation detector, and means applying to the electrodes potentials at which the counter operates as a Geiger-Müller counter along the plateau region of its discharge characteristic producing pulses in response to the said cosmic radiation.

9. A Geiger-Müller guard counter for detecting cosmic radiation and the like comprising a first open-ended hollow metal electrode having integral side and top portions, a second hollow metal electrode surrounding the first hollow electrode and also possessing integral side and top portions spaced about the same distance from the corresponding portions of the first electrode, insulating means extending between the side portions and closing off substantially at the bottom the space between the electrodes, an ionizable gas fill including a halogen quench in the said space, said first, hollow electrode being opaque to beta particles, terminal connections to said first and second metal electrodes, and a source of potential coupled to said terminal connections for operating said counter as a Geiger-Müller counter along the plateau region of its discharge characteristic producing pulses in response to the said cosmic radiation.

10. A Geiger-Müller counter for detecting cosmic radiation and the like comprising a pair of spaced, concentric, spheroidal, conductive members, insulating means extending between the conductive members and closing off the annular space substantially at the ends of the spheroidal members, the inner member having an opening at its end for receiving on its interior a radiation detector and activated sample, said conductive members and insulating means defining a discharge space, an ionizable gas fill including a halogen quench within the discharge space and means applying to the conducting members potentials at which the counter operates as a Geiger-Müller counter along the plateau region of its discharge characteristic producing pulses in response to the said cosmic radiation.

11. Radiation measuring apparatus comprising: a single guard Geiger-Müller counter responsive to cosmic radiation and the like comprising at first hollow hemispherical electrode, a second hollow hemispherical electrode surrounding the first electrode and concentric therewith, insulating means extending between the electrodes and closing off substantially at the bottom the space between the electrodes, an ionizable gas fill including a halogen quench in the said space, and means for applying potentials to the first and second electrodes at which the guard counter operates as a Geiger-Müller counter along the plateau region of its discharge characteristic and produces electrical pulses in response to cosmic radiation; a sample counter also responsive to cosmic radiation within the first hollow electrode and producing electrical pulses; radiation shielding surrounding the guard counter; and anti-coincidence circuitry coupled to both the guard and sample counters to reject pulses of the sample counter when a pulse of the guard counter is simultaneously present.

12. Apparatus as set forth in claim 5, wherein space is provided within the first hollow electrode for also receiving a sample whose activity is to be measured by the sample counter, and radiation shielding surrounds the guard counter.

References Cited in the file of this patent

UNITED STATES PATENTS

| | | |
|---|---|---|
| 2,445,305 | Hochgesang | July 13, 1948 |
| 2,479,271 | Shonka | Aug. 16, 1949 |
| 2,481,506 | Gamertsfelder | Sept. 13, 1949 |
| 2,491,220 | Segre et al. | Dec. 13, 1949 |
| 2,499,489 | Goldstein et al. | Mar. 7, 1950 |
| 2,552,723 | Koury | May 15, 1951 |
| 2,562,968 | Teichmann et al. | Aug. 7, 1951 |
| 2,574,000 | Victoreen | Nov. 6, 1951 |
| 2,599,166 | Dempster | June 3, 1952 |
| 2,612,615 | Fehr et al. | Sept. 30, 1952 |
| 2,622,208 | Bernstein et al. | Dec. 16, 1952 |
| 2,756,348 | Schneider | July 24, 1956 |

FOREIGN PATENTS

| | | |
|---|---|---|
| 682,657 | Germany | Oct. 19, 1939 |